(12) United States Patent
Hoppe et al.

(10) Patent No.: US 8,477,002 B2
(45) Date of Patent: Jul. 2, 2013

(54) ELECTROMAGNETIC HYDRAULIC VALVE

(75) Inventors: Jens Hoppe, Erlangen (DE); Stefan Konias, Erlangen (DE); Yi Wang, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/580,684

(22) PCT Filed: Jan. 25, 2011

(86) PCT No.: PCT/EP2011/050980
§ 371 (c)(1),
(2), (4) Date: Aug. 23, 2012

(87) PCT Pub. No.: WO2011/104059
PCT Pub. Date: Sep. 1, 2011

(65) Prior Publication Data
US 2012/0319018 A1 Dec. 20, 2012

(30) Foreign Application Priority Data

Feb. 26, 2010 (DE) .................. 10 2010 009 400

(51) Int. Cl.
*F16K 31/06* (2006.01)
*H01H 3/00* (2006.01)
*H01H 7/08* (2006.01)

(52) U.S. Cl.
USPC ..................... 335/278; 335/260; 335/281

(58) Field of Classification Search
USPC ............... 335/260, 278, 281; 251/129.15
See application file for complete search history.

(56) References Cited

FOREIGN PATENT DOCUMENTS

| DE | 102005053961 | 5/2006 |
|----|--------------|--------|
| DE | 102006042215 | 3/2008 |
| DE | 10162754 | 9/2008 |
| EP | 0555177 | 8/1993 |

*Primary Examiner* — Ramon Barrera
(74) *Attorney, Agent, or Firm* — Volpe and Koenig, P.C.

(57) ABSTRACT

An electromagnetic hydraulic valve, having a solenoid (1) with a coil carrier (3), which receives at least one coil (4) in a completely encapsulated manner in an injection-molded encapsulation (7) and carries at least one terminal, wherein the terminal is formed of individual segments (10, 11) which are inserted into radially extending through openings (8, 9) that are formed in the coil carrier (3) and in the insert molding (7) adjacent to the at least one coil (4).

7 Claims, 3 Drawing Sheets

ELECTROMAGNETIC HYDRAULIC VALVE

FIELD OF THE INVENTION

The invention relates to an electromagnetic hydraulic valve, comprising an electromagnet having a coil carrier which accommodates at least one coil in a completely enclosed fashion in an injection-molded encapsulation and has at least one end pole.

BACKGROUND

Electromagnetic hydraulic valves of this type are used, inter alia, in valve drives of internal combustion engines in which changes to opening times and closing times of gas exchange valves can be brought about by phase adjustment of a camshaft with respect to a crankshaft using an adjustment device. In this context, the electromagnetic hydraulic valve usually regulates the supply of pressurized fluid to a hydraulic adjustment device of the respective camshaft.

DE 10 2005 053 961 A1 discloses an electromagnetic hydraulic valve which is comprised of an electromagnet and an adjoining valve part. The electromagnet has here a hollow-cylinder-shape coil carrier which is comprised of a plurality of individual parts and accommodates a coil in a completely enclosed fashion between these parts. A radial coil carrier part located within the coil also forms a magnetizable section at an axial end and has in an inner drilled hole a magnet armature which can move axially counter to a restoring spring.

If the coil is then supplied with current via a connection section provided on the coil carrier of the electromagnet, the end section of the inner coil carrier part is magnetized by the generated magnetic field and forms an end pole of the electromagnet. Depending on the current supplied to the coil and the associated magnetization of the end section, the magnet armature is correspondingly moved axially in the direction of the end section counter to the restoring spring. In this context, the magnet armature moves a displaceable control piston which is accommodated in the valve part adjoining the electromagnet. Depending on the position of the control piston set as a result of this, a flow of fluid across the valve part is regulated.

In the case of DE 10 2005 053 961 A1, the end pole for moving the magnet armature is therefore formed by a coil carrier part which is inserted axially into the cylindrical interior space of the coil and whose end region can be magnetized.

Furthermore, DE 10 2006 042 215 A1 discloses an electromagnetic hydraulic valve which is comprised of an electromagnet and a valve part and in which a coil carrier of the electromagnet accommodates a coil in a completely enclosed fashion in an injection-molded encapsulation. In addition, a magnetizable insertion part is placed in the radial inner region of the coil, which insertion part is also supported by the injection-molded encapsulation of the coil carrier and forms an end pole of the electromagnet when the coil is energized. However, in order to prevent moisture penetrating via the injection-molded region of the insertion part, an O-ring is introduced between the coil carrier and the injection-molded encapsulation in the axial direction so that it is positioned in front of the insertion part.

The coil carrier also has, in an interior space, an axially movable magnet armature which carries out a translatory movement under the influence of the magnetized insertion part when the coil is energized, and in the process this coil carrier moves a control piston of the valve part. The valve part is embodied here as a 4/3-way valve so that depending on the position of the control piston pressure medium passes from the pump connection to one of the two working connections, while the respective other working connection is connected to an end-side tank connection.

SUMMARY

Taking an arrangement according to the prior art as a basis, the object of the present invention is to make available an electromagnetic hydraulic valve which has a compact design and can be fabricated with low manufacturing expenditure.

This object is achieved on the basis of the preamble in conjunction with the characterizing features thereof. The further dependent claims each represent advantageous developments of the invention.

The invention comprises the technical teaching that the end pole of the electromagnet is comprised of individual segments which are inserted into radially extending through openings which are formed in the coil carrier and in the injection-molded encapsulation, adjacent to the at least one coil. As a result of this measure, the end pole can be inserted into the coil carrier independently of the complete injection-molded encapsulation of the coil and without damaging said encapsulation, with the result that reliable protection of the coil against the ingress of fluid can be ensured without using sealing elements such as O-rings. Furthermore, this consequently makes the positioning of the end pole very compact. This is because the individual segments of the end pole are not positioned in the radial inner region of the coil but rather axially adjacent thereto. As a result, in particular the radial extent can be kept small. Finally the robustness of the system with respect to mounting can also be significantly increased.

In contrast to this, in electromagnetic hydraulic valves according to the prior art, an element which forms the end pole is either inserted axially into the inner region of the coil carrier after injection-molded encapsulation of the coil, thereby increasing the radial installation space, or insertion parts as end poles are encapsulated by injection molding together with the coil, but this makes it necessary to use sealing elements in order to prevent the ingress of moisture into the region of the coil. Systems according to the prior art therefore also either have a relatively large installation space or involve a relatively high level of expenditure on manufacture.

According to one embodiment of the invention, the individual segments have circular-ring-segment-like contours which each correspond to a cross section of the respectively associated through opening. This has the advantage that the individual segments therefore merely fill the space of the respective through opening and as a result do not adversely affect the interior space of the coil carrier and therefore also the guidance of the magnet armature.

In one development of the invention, unwinding-side and winding-on-side connections of the at least one coil respectively lead to a connection section in axial webs between the through openings. This measure allows a power supply to the at least one coil to be routed without problem via the injection-molded encapsulation of the coil carrier despite the adjacent end pole individual segments.

A further advantageous embodiment of the invention is that the through openings have, at least in certain areas, transversely extending ribs on axial boundaries. By means of these ribs, the individual segments of the end pole are held in the desired position after mounting, and in addition tolerance-related fluctuations in dimensions in this region are compensated.

According to a further refinement of the invention, the individual segments are embodied as punched parts. This advantageously permits simple manufacture of the individual segments to be implemented.

Furthermore, the injection-molded encapsulation of the coil carrier is expediently composed of plastic. This has the advantage that robust and easy-to-manufacture encapsulation of the at least one coil and of the electrical connection to the connection section can be produced.

BRIEF DESCRIPTION OF THE DRAWINGS

Further measures which improve the invention are represented in more detail below together with the description of a preferred embodiment of the invention with reference to figures. In the drawing.

DETAILED DESCRIPTION OF THE PREFERRED EMBODIMENTS

Figure 1:
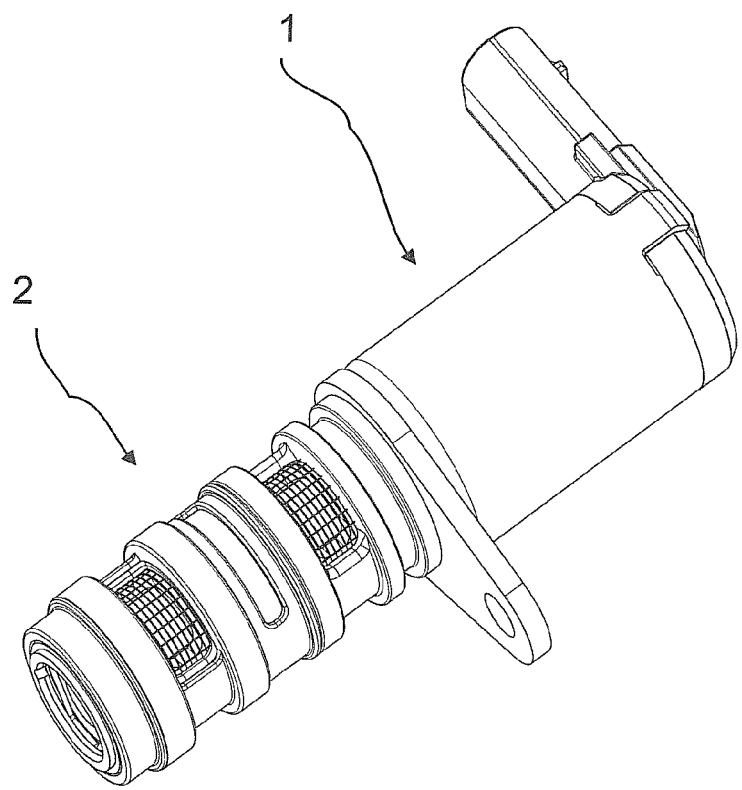
FIG. 1 shows a perspective view of the electromagnetic hydraulic valve according to the invention.

FIG. 1 shows a perspective view of the electromagnetic hydraulic valve according to the invention, which hydraulic valve is comprised of an electromagnet 1 and a valve part 2. The electromagnet 1 and the valve part 2 are directly joined to one another here, wherein the valve part 2 has a design which is known to a person skilled in the art, and therefore details are only to be given below on the design of the electromagnet 1.

Figure 2:
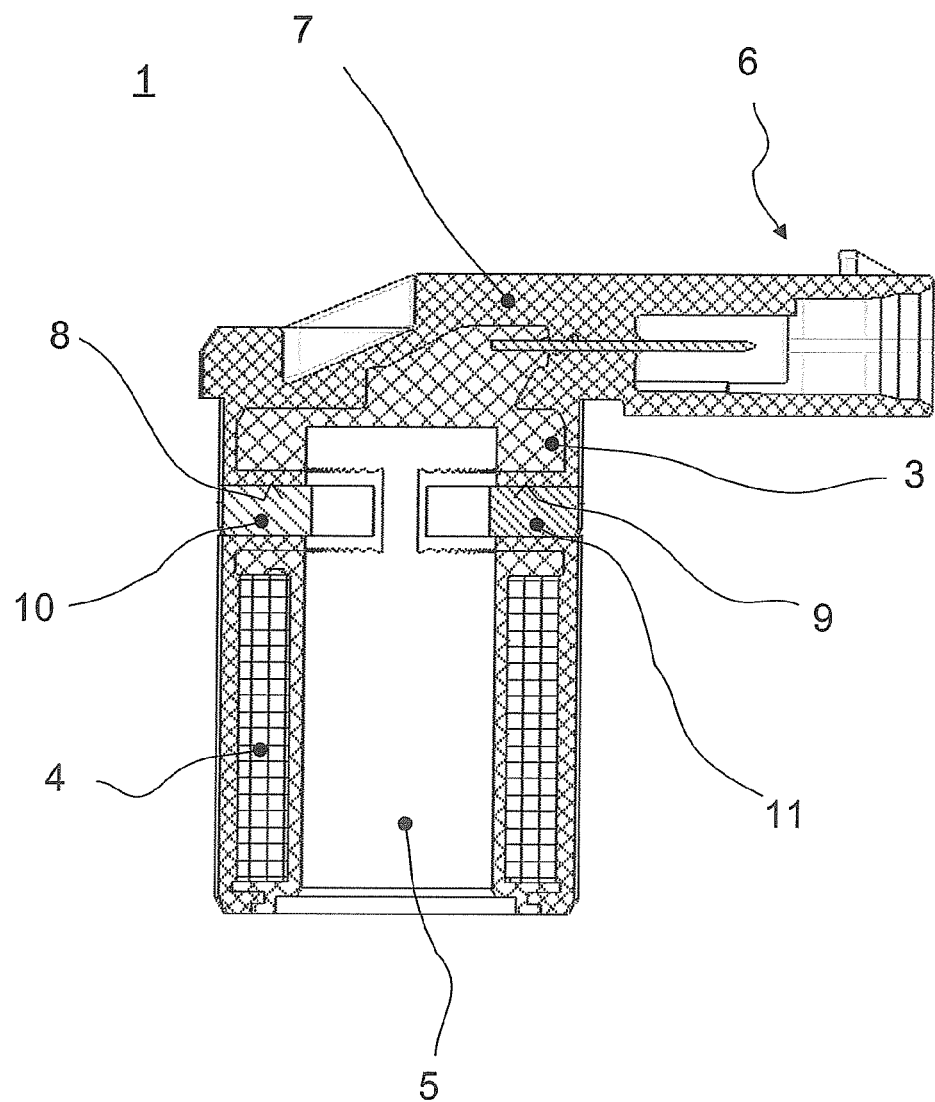
FIG. 2 shows a longitudinal section through an electromagnet of the hydraulic valve according to the invention with inserted individual segments.

FIG. 2 illustrates a longitudinal section of the electromagnet 1. The latter has a coil carrier 3 which, on the one hand, accommodates a coil 4 and, on the other hand, guides a magnet armature (not illustrated for reasons of clarity) in an axially movable fashion in an interior space 5. The magnet armature and the means of guiding this magnet armature in the coil carrier 3 are embodied in a way which is known to a person skilled in the art. Furthermore, the electromagnet 1 has a connection section 6 to which a power supply can be connected, wherein the current is then conducted to the coil 4 via winding-on-side and unwinding-side connections (not illustrated either). In order then to protect the coil 4, in particular, against the influences of moisture from the surroundings, the coil carrier 3 and also the connection section 6 are provided with an injection-molded encapsulation 7 which completely encloses the coil 4. This injection-molded encapsulation 7 is comprised here of plastic.

In an axial direction adjacent to the coil 4, radially extending through openings 8 and 9, into which each individual segment 10 and 11 is inserted, are provided in the coil carrier 3 and also in the injection-molded encapsulation 7.

Figure 3:
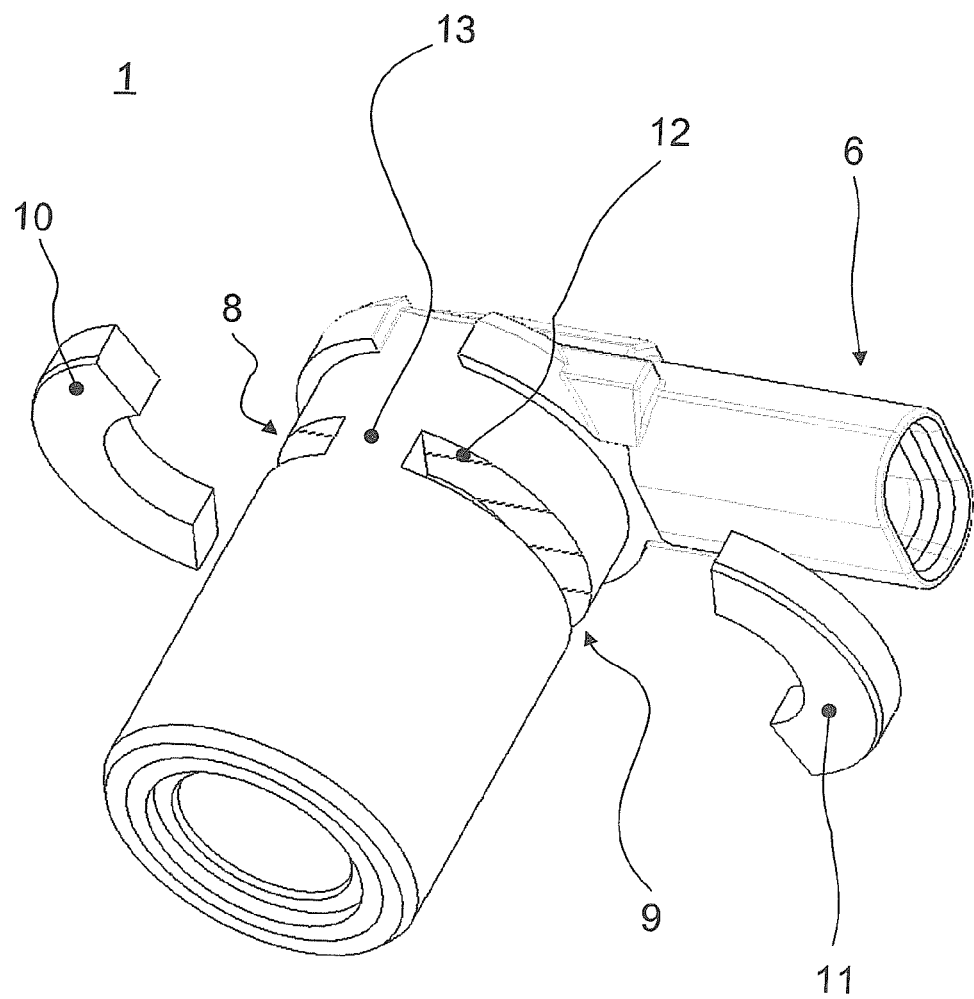
FIG. 3 shows a perspective view of the electromagnet with individual segments removed.

As is apparent, in particular, from the perspective view of the electromagnet 1 in FIG. 3, these individual segments 10 and 11 are embodied as circular ring segments which correspond to the respective through opening 8 or 9. In the inserted state, the individual segments 10 and 11 completely fill the through openings 8 and 9, and when the coil 4 is energized they form the magnetized end pole of the electromagnet 1 via which the magnet field generated by the coil 4 is conducted into the interior space 5 of the coil carrier 3. As a result, a translatory displacement of the magnet armature in the interior space 5 of the electromagnet 1 is brought about in a way which is known to a person skilled in the art, and moreover in the installed state of the electromagnetic hydraulic valve a corresponding displacement of a control piston guided in the valve part 2 is also brought about in order to regulate a flow of fluid across the valve part 2.

Finally, it is apparent in FIG. 3 that the through openings 8 and 9 each have transversely extending ribs 12 on axial boundaries, which ribs 12 give rise to an interference fit assembly when the respective individual segment 10 or 11 is inserted and in addition compensate tolerance-related fluctuations in dimensions in the respective region. In addition, axial webs 13 by means of which the winding-on-side and unwinding-side connections of the coil 4 are guided to the connection section 6 underneath the injection-molded encapsulation 7.

Through the embodiment according to the invention it is therefore possible to provide an electromagnetic hydraulic valve with a compact design which is distinguished at the same time by a low level of expenditure on fabrication. Since the injection-molded encapsulation 7 in the region of the coil carrier 3 and of the connection section 6 can already be provided before the individual segments 10 and 11 which form the end pole are inserted into the respectively associated through openings 8 and 9. As a result, a reliable seal of the coil 4 can be ensured in the region of the coil carrier 3 without using additional sealing means. Furthermore, the arrangement of the individual segments 10 and 11 does not give rise to an increase in the radial installation space.

LIST OF REFERENCE NUMBERS

1 Electromagnet
2 Valve part
3 Coil carrier
4 Coil
5 Interior space
6 Connection section
7 Injection-molded encapsulation
8 Through opening
9 Through opening
10 Individual segment
11 Individual segment
12 Ribs
13 Axial web

The invention claimed is:

1. An electromagnetic hydraulic valve, comprising an electromagnet having a coil carrier which accommodates at least one coil in a completely enclosed fashion in an injection-molded encapsulation and has at least one end pole, the end pole is comprised of individual segments which are inserted into radially extending through openings which are formed in the coil carrier and in the injection-molded encapsulation, adjacent to the at least one coil.

2. The electromagnetic hydraulic valve as claimed in claim 1, wherein the individual segments each have a circular-ring-segment contour which each correspond to a cross section of the respectively associated through opening.

3. The electromagnetic hydraulic valve as claimed in claim 1, wherein unwinding-side and winding-on-side connections of the at least one coil respectively lead to a connection section in axial webs located between the through openings.

4. The electromagnetic hydraulic valve as claimed in claim 1, wherein the through openings have, at least in certain areas, transversely extending ribs on axial boundaries thereof.

5. The electromagnetic hydraulic valve as claimed in claim 1, wherein the individual segments are punched parts.

6. The electromagnetic hydraulic valve as claimed in claim 1, wherein the injection-molded encapsulation is comprised of plastic.

7. A device for adjusting the rotational angle of a camshaft with respect to a crankshaft of an internal combustion engine, comprising an electromagnetic hydraulic valve as claimed in claim 1.

* * * * *